United States Patent
Takishita et al.

(10) Patent No.: US 8,672,072 B2
(45) Date of Patent: Mar. 18, 2014

(54) CONSTRUCTION MACHINE

(75) Inventors: Tatsuo Takishita, Koka (JP); Katsuyoshi Nasu, Konan (JP); Hajime Kurikuma, Koka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 48 days.

(21) Appl. No.: 13/503,942

(22) PCT Filed: May 20, 2011

(86) PCT No.: PCT/JP2011/061688
§ 371 (c)(1),
(2), (4) Date: Apr. 25, 2012

(87) PCT Pub. No.: WO2011/155309
PCT Pub. Date: Dec. 15, 2011

(65) Prior Publication Data
US 2012/0205171 A1    Aug. 16, 2012

(30) Foreign Application Priority Data
Jun. 9, 2010   (JP) ................................. 2010-132204

(51) Int. Cl.
B60K 11/06 (2006.01)
(52) U.S. Cl.
USPC ...................................................... 180/68.1
(58) Field of Classification Search
USPC ........ 180/68.1, 305, 306, 315, 271, 272, 281, 180/286, 289
See application file for complete search history.

(56) References Cited

U.S. PATENT DOCUMENTS

| | | | | |
|---|---|---|---|---|
| 4,366,881 A | * | 1/1983 | Frisbee | 180/271 |
| 5,343,077 A | * | 8/1994 | Yoshida et al. | 340/5.64 |
| 5,425,431 A | * | 6/1995 | Brandt et al. | 180/273 |
| 5,984,040 A | * | 11/1999 | Lee | 180/271 |
| 6,483,423 B1 | * | 11/2002 | Han | 340/3.1 |
| 6,595,180 B2 | * | 7/2003 | Thompson et al. | 123/198 DB |

(Continued)

FOREIGN PATENT DOCUMENTS

| | | |
|---|---|---|
| JP | 2002-275936 A | 9/2002 |
| JP | 2004-224133 A | 8/2004 |

(Continued)

OTHER PUBLICATIONS

International Preliminary Report on Patentability received in International Application No. PCT/JP2011/061688 dated Jan. 24, 2013.

Primary Examiner — Frank Vanaman
(74) Attorney, Agent, or Firm — Mattingly & Malur, PC

(57) ABSTRACT

A construction machine that can limit consumption of battery electric power is provided. The construction machine includes: air-cooled heat exchangers 47, 48; a cooling fan 49 for generating cooling air for the heat exchangers 47, 48; a fan electric drive motor 50 that is driven by electric power of a battery 8 for rotating the cooling fan 49; an inverter unit 30 for drivingly controlling the fan electric drive motor 50; a lock lever 25 disposed at a boarding-alighting port and configured to be operated into an unlocked position and a locked position; and a lock valve 42 for making an operation of an operating device 27 or the like ineffective or the operating device inoperative when the lock lever 25 is operated into the locked position. The inverter unit 30 stops the fan electric drive motor 50 when the lock lever 25 is operated into the locked position.

5 Claims, 7 Drawing Sheets

(56) References Cited

U.S. PATENT DOCUMENTS

| | | | |
|---|---|---|---|
| 7,740,259 B2 * | 6/2010 | Kraimer et al. | 280/166 |
| 2006/0061106 A1 | 3/2006 | Asakage et al. | |
| 2009/0277706 A1 * | 11/2009 | Sturmon et al. | 180/68.1 |
| 2011/0303472 A1 * | 12/2011 | Robinson | 180/68.1 |

FOREIGN PATENT DOCUMENTS

| | | |
|---|---|---|
| JP | 2006-057348 A | 3/2006 |
| JP | 2007-126898 A | 5/2007 |
| JP | 2009-197514 A | 9/2009 |

* cited by examiner

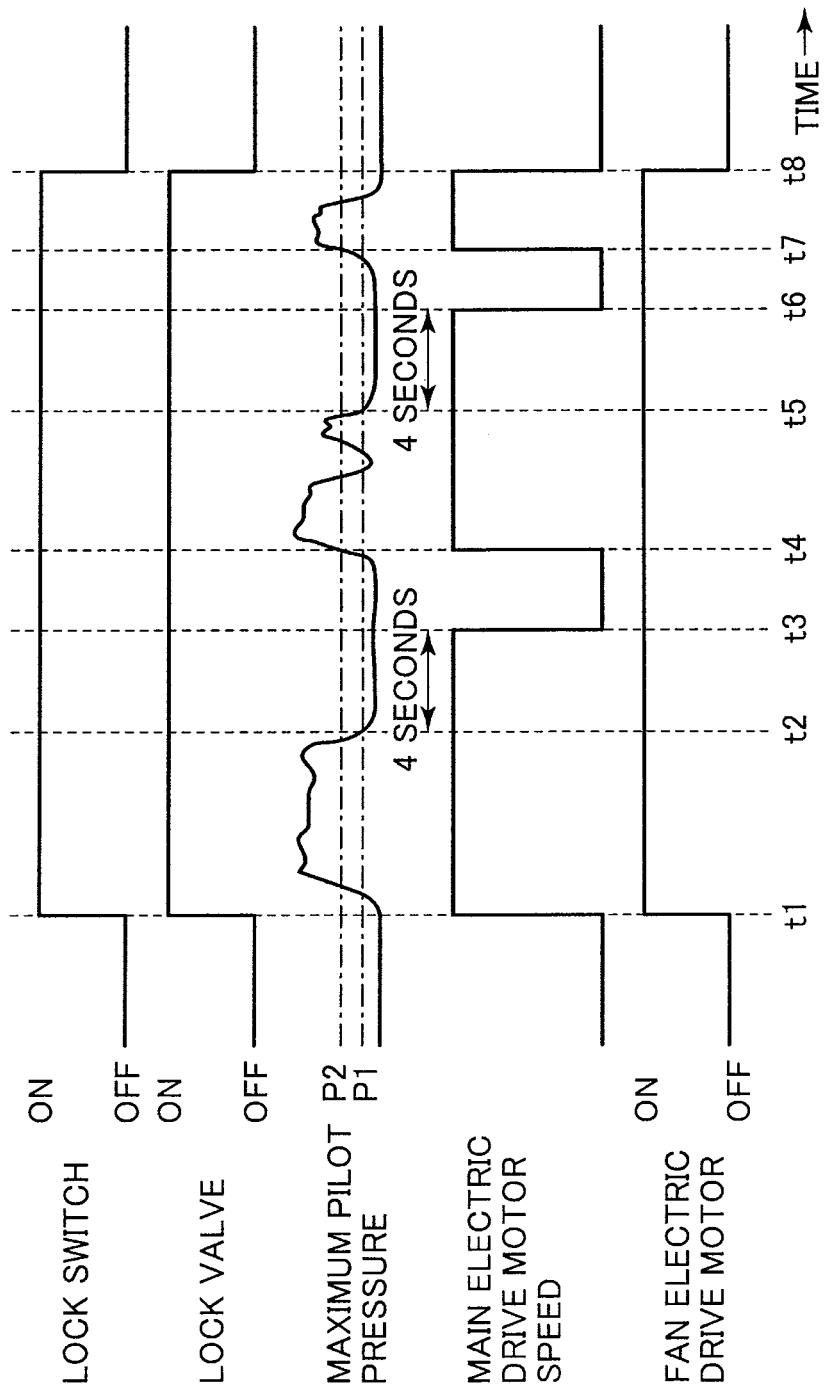

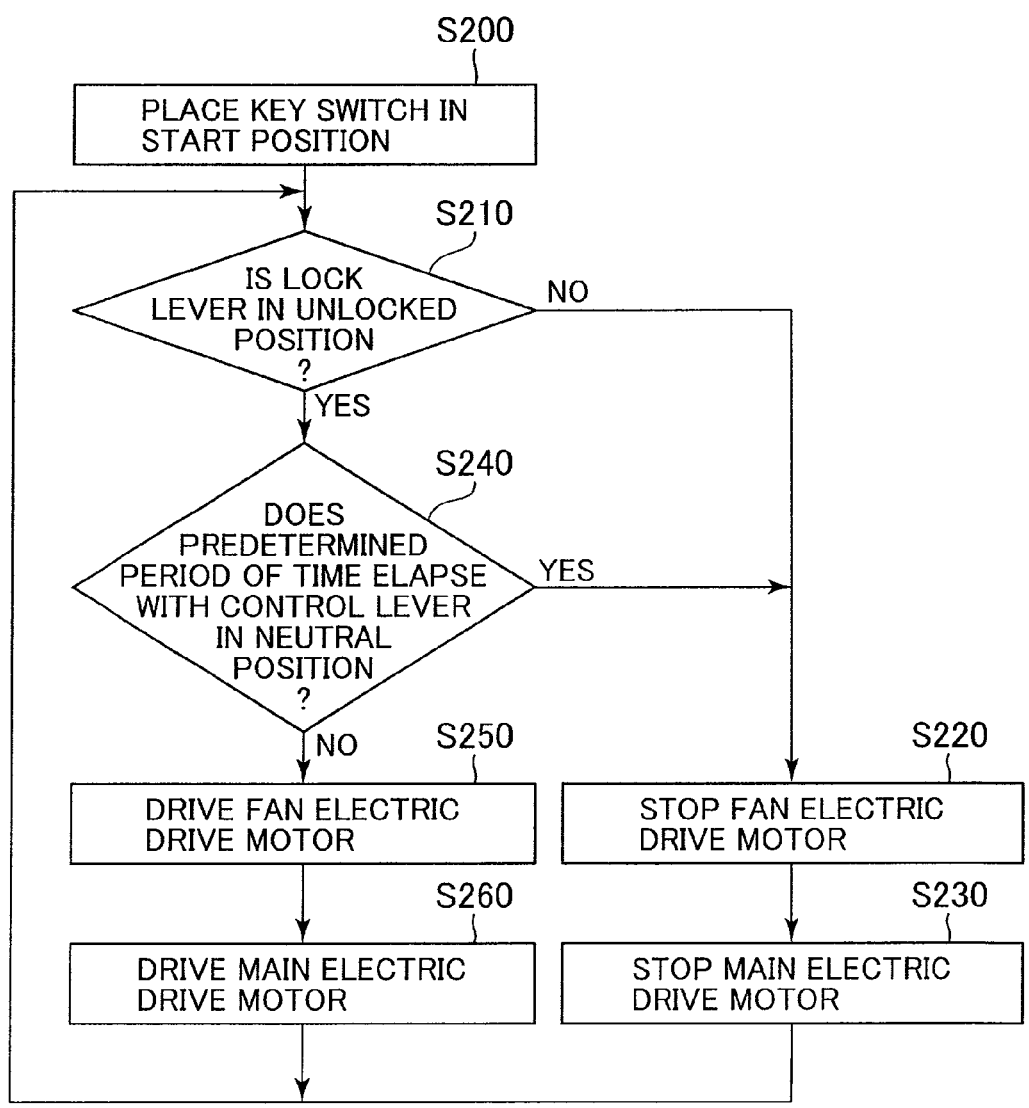

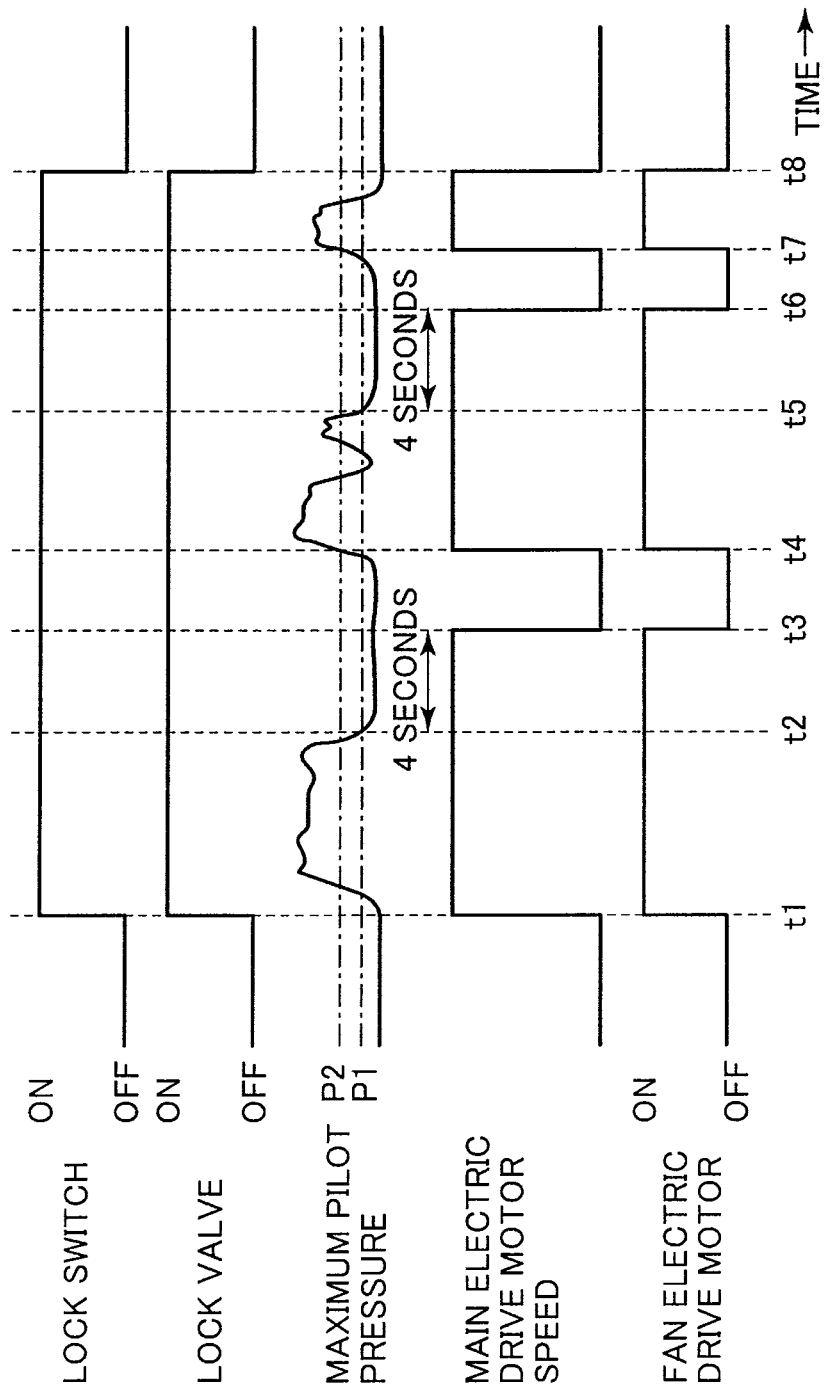

CONSTRUCTION MACHINE

TECHNICAL FIELD

The present invention relates, in general, to construction machines, such as hydraulic excavators, and in particular, to a construction machine including a fan electric drive device, driven by electric power of a battery, for rotating a cooling fan.

BACKGROUND ART

In general, a hydraulic excavator as a construction machine includes a lower track structure, an upper swing structure disposed swingably on the lower track structure, and an articulated work implement (work device) including a boom, an arm, and a bucket, which is disposed elevatably on the upper swing structure. A hydraulic drive system of this hydraulic excavator includes a prime mover (specifically, for example, an engine or a main electric drive motor), a main pump and a pilot pump which are driven by the prime mover, a plurality of directional control valves for controlling respective flows of hydraulic fluid from the main pump to a plurality of hydraulic actuators (specifically, for example, a boom hydraulic cylinder, an arm hydraulic cylinder, and a bucket hydraulic cylinder), and a plurality of operating devices for directing operations of the multiple hydraulic actuators. The operating device is, for example, a hydraulic pilot type including a pilot valve that uses a delivery pressure of the pilot pump as a source pressure to thereby generate a pilot pressure reduced according to an operation of a control lever. The pilot pressure thus generated is then output to a pressure receiving portion of the directional control valve to thereby change the position of the directional control valve.

The hydraulic excavator includes an air-cooled heat exchanger (specifically, for example, an oil cooler for cooling hydraulic fluid and, in a hydraulic excavator having an engine as the prime mover, for example, a radiator for cooling engine coolant) and a cooling fan for generating cooling air for the heat exchanger. A known hydraulic excavator includes a fan electric drive device, driven by electric power of a battery, for rotating a cooling fan independently of a prime mover (see, for example, patent document 1). This fan electric drive device includes, for example, a fan electric drive motor for rotating a cooling fan. Or, the fan electric drive device includes, for example, a fan hydraulic motor for rotating a cooling fan, a fan pump for generating hydraulic fluid to be supplied to the fan hydraulic motor, and a fan electric drive motor for driving the fan pump.

Other known hydraulic excavators include a lock lever and locking means provided for preventing the operating device from being erroneously operated (see, for example, patent documents 2 and 3). Specifically, the lock lever is disposed at a boarding-alighting port and placed into an unlocked position (specifically, a lowered position of impeding boarding and alighting of an operator) and a locked position (specifically, a raised position of permitting boarding and alighting of the operator). The locking means makes an operation of the operating device ineffective or the operating device inoperative when the lock lever is placed in the locked position.

The hydraulic excavator disclosed in patent document 2 includes, as locking means for making an operation of a work operating device ineffective when a lock lever is placed in a locked position, a lock switch (stop switch) and a solenoid lock valve (cutoff valve). The lock switch opens and closes according as the lock lever is operated. The lock valve is disposed at a hydraulic line between a pilot pump and the operating device and operated by a signal from the lock switch. When, for example, the lock lever is placed in an unlocked position, the lock switch closes to thereby operate the lock valve, providing communication between the pilot pump and the operating device. When, for example, the lock lever is placed in the locked position, on the other hand, the lock switch opens to thereby make the lock valve inoperative, which interrupts the communication between the pilot pump and the operating device. As a result, no pilot pressure is generated even when the control lever of the work operating device is operated, so that a hydraulic actuator is inoperative.

The hydraulic excavator further includes, as locking means for making a travel operating device inoperative when the lock lever is placed in the locked position, a lever engaging portion connected to the lock lever. When, for example, the lock lever is placed in the locked position, the lever engaging portion restricts a control lever of the travel operating device. This makes the control lever inoperative, so that a hydraulic actuator is inoperative.

The electrically driven hydraulic excavator disclosed in patent document 3 (specifically, a hydraulic excavator having a main electric drive motor as the prime mover) includes, as locking means, a control unit that stops the main electric drive motor when a lock lever is placed in a locked position.

PRIOR ART DOCUMENTS

Patent Documents

Patent Document 1
JP-2002-275936-A
Patent Document 2
JP-2007-126898-A
Patent Document 3
JP-2009-197514-A

SUMMARY OF THE INVENTION

Problem to be Solved by the Invention

In the electrically driven hydraulic excavator disclosed in patent document 3, the main electric drive motor is stopped when the lock lever is placed in the locked position. This limits consumption of battery electric power by the main electric drive motor. However, in known hydraulic excavators including such an electrically driven hydraulic excavator, no consideration is given to consumption of battery electric power by the fan electric drive device, which needs improvement. Specifically, when the lock lever is placed in the locked position, the above-described locking means makes an operation of the operating device ineffective or the operating device inoperative, so that the hydraulic actuator (load) is inoperative. Temperature of a medium to be cooled by the heat exchanger does not therefore increase very much. In a hydraulic excavator in which the prime mover is stopped or a speed thereof is reduced when the lock lever is placed in the locked position, in particular, the temperature of the medium does not increase very much. A cooling fan can, accordingly, be stopped. If the cooling fan is brought to a stop in such occasions, consumption of the battery electric power can be limited. In the electrically driven hydraulic excavator, in particular, operating time can be extended by limiting the consumption of the battery electric power.

An object of the present invention is to provide a construction machine that can limit consumption of battery electric power.

Means for Solving the Problem (1) To achieve the foregoing object, an aspect of the present invention provides a construction machine including: an air-cooled heat exchanger; a cooling fan for generating cooling air for the heat exchanger; a battery; a fan electric drive device for rotating the cooling fan, the fan electric drive device being driven by electric power of the battery; fan control means for drivingly controlling the fan electric drive device; a lock lever disposed at a boarding-alighting port and configured to be operated into an unlocked position and a locked position; an operating device for directing an operation of a hydraulic actuator; and locking means for making an operation of the operating device ineffective or the operating device inoperative when the lock lever is operated into the locked position, wherein the fan control means stops the fan electric drive device when the lock lever is operated into the locked position.

(2) In (1) above, preferably, the construction machine further includes operation detecting means for detecting whether the operating device is in a condition of not being operated, wherein the fan control means stops the fan electric drive device when a predetermined period of time elapses under a condition in which the lock lever is operated into the unlocked position and the operating device is in the condition of not being operated.

(3) In (1) or (2) above, preferably, the construction machine further includes: a main pump for generating hydraulic fluid to be supplied to the hydraulic actuator; a main electric drive motor for driving the main pump, the main electric drive motor being driven by the electric power of the battery; and main control means for drivingly controlling the main electric drive motor, wherein the main control means stops the main electric drive motor when the lock lever is operated into the locked position.

(4) In (3) above, preferably, the main control means stops the main electric drive motor when a predetermined period of time elapses under a condition in which the lock lever is operated into the unlocked position and the operating device is in the condition of not being operated.

Effect of the Invention

According to the aspect of the present invention, consumption of the battery electric power can be limited.

BRIEF DESCRIPTION OF THE DRAWINGS

FIG. 5 is a timing chart for illustrating operations in the embodiment of the present invention.

FIG. 6 is a flow chart showing steps to be performed in an arithmetic control section of an inverter unit according to another embodiment of the present invention.

FIG. 7 is a timing chart for illustrating operations in another embodiment of the present invention.

MODES FOR CARRYING OUT THE INVENTION

An embodiment of the present invention will be described below with reference to the accompanying drawings, with an electrically driven hydraulic excavator to which the present invention is applied taken as an example.

Figure 1:
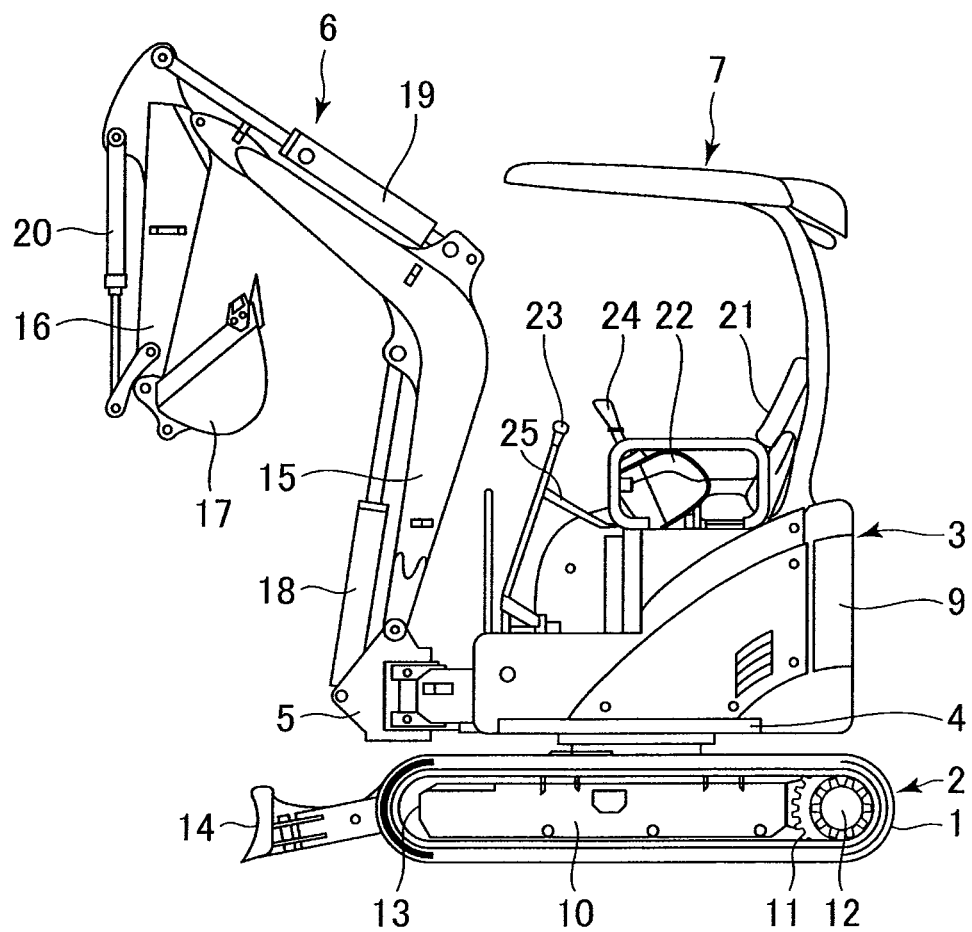
FIG. 1 is a side elevational view showing general arrangements of an electrically driven hydraulic excavator to which the present invention is applied.

FIG. 1 is a side elevational view showing general arrangements of the electrically driven hydraulic excavator to which the present invention is applied.

Referring to FIG. 1, the electrically driven hydraulic excavator includes a lower track structure 2, an upper swing structure 3, a swing frame 4, a swing post 5, an articulated front work implement 6, a canopy type cab 7, and a battery mounting section 9. Specifically, the lower track structure 2 includes right and left crawlers 1. The upper swing structure 3 is mounted swingably on an upper portion of the lower track structure 2. The swing frame 4 constitutes a foundation lower portion structure of the upper swing structure 3. The swing post 5 is mounted at a front portion of the swing frame 4 so as to be horizontally rotatable. The front work implement 6 is mounted on the swing post 5 so as to be movable vertically (capable of looking up or down). The cab 7 is disposed on the left side on the swing frame 4. The battery mounting section 9 is disposed at a rear side on the swing frame 4 and stores therein a battery 8 (see FIG. 2 to be described later).

The lower track structure 2 includes a track frame 10, right and left drive wheels 11, right and left travel hydraulic motors 12, and right and left driven wheels (idlers) 13. Specifically, the track frame 10 is substantially H-shaped. The drive wheels 11 are rotatably supported at positions near rear ends of lateral both sides of the track frame 10. The travel hydraulic motors 12 drive respective drive wheels 11. The driven wheels 13 are rotatably supported at positions near front ends of the lateral both sides of the track frame 10 and rotated by respective driving forces of the drive wheels 11 via the crawlers 1.

An earth-removing blade 14 is vertically movably disposed at a front side of the track frame 10. The blade 14 is moved vertically by a blade hydraulic cylinder (not shown). In addition, a swing wheel (not shown) is disposed between a center portion of the track frame 10 and the swing frame 4. A swing hydraulic motor (not shown) is disposed on a diametrically inside of the swing wheel. The swing hydraulic motor rotates the swing frame 4 relative to the lower track structure 2.

The swing post 5 is horizontally rotatable relative to the swing frame 4 via a vertical pin (not shown). The swing post 5 is rotated horizontally by a swing hydraulic cylinder (not shown), which results in the front work implement 6 being swung to the right and left.

The front work implement 6 includes a boom 15, an arm 16, and a bucket 17. Specifically, the boom 15 is rotatably connected to the swing post 5. The arm 16 is rotatably connected to a leading end portion of the boom 15. The bucket 17 is rotatably connected to a leading end portion of the arm 16. The boom 15, the arm 16, and the bucket 17 are operated by a boom hydraulic cylinder 18, an arm hydraulic cylinder 19, and a bucket hydraulic cylinder 20, respectively. It is noted that the bucket 17 is replaceable with, for example, an attachment (not shown) that incorporates an optional hydraulic actuator.

The cab 7 includes an operator seat (seat) 21, a left console box 22, and a right console box (not shown). An operator sits on the operator seat 21. The left console box 22 is disposed on the left side, and the right console box is disposed on the right side, of the operator seat 21. An operating device is disposed forwardly of the operator seat 21. The operating device includes right and left travel control levers 23 that are operated in a longitudinal direction to thereby direct operations of the right and left travel hydraulic motors 12, thus making the hydraulic excavator travel. An operating device (not shown) including an optional control pedal (not shown) for directing an operation of the optional hydraulic actuator is disposed at a foot portion to the left of the left travel control lever 23. An operating device (not shown) including a swing control pedal (not shown) that is operated in a lateral direction to thereby direct an operation of the swing hydraulic cylinder, thus swinging the swing post 5 (or the entire front work implement 6) to the right and left, is disposed at a foot portion to the right of the right travel control lever 23.

An operating device (not shown) including a crisscross operating arm/swing control lever 24 is disposed at a front portion of the left console box 22. The arm/swing control lever 24 is operated longitudinally to direct an operation of the arm hydraulic cylinder 19, thereby driving the arm 16, and operated laterally to direct an operation of the swing hydraulic motor, thereby swinging the upper swing structure 3. A lock lever 25 is disposed at the front portion of the left console box 22 (or stated differently, at a boarding-alighting port). The lock lever 25 is rotationally operated into an unlocked position (specifically, a lowered position of impeding boarding and alighting of the operator) and a locked position (specifically, a raised position of permitting boarding and alighting of the operator, as shown in FIG. 1).

An operating device 27 (see FIG. 2 to be described later) including a crisscross operating boom/bucket control lever 26 (see FIG. 2 to be described later) and an operating device (not shown) including a blade control lever (not shown) are disposed at a front portion of the right console box. The boom/bucket control lever 26 is operated longitudinally to direct an operation of the boom hydraulic cylinder 18, thereby driving the boom 15, and operated laterally to direct an operation of the bucket hydraulic cylinder 20, thereby driving the bucket 17. The blade control lever is operated longitudinally to direct an operation of the blade hydraulic cylinder, thereby driving the blade 14.

A key switch 28 (see FIG. 3 to be described later) is disposed at the right console box. Though details are not shown, the key switch 28 includes a key cylinder and a key to be inserted into the key cylinder. The key switch 28 is rotatably placed into a position of OFF, ON, or START in that sequence. Additionally, a speed indicating device 29 (see FIG. 3 to be described later) including a longitudinally operable speed indicating lever (not shown) is disposed at a rear portion of the right console box. The speed indicating device 29 includes a displacement detector (not shown) for detecting a position in which the speed indicating lever is operated. The displacement detector outputs an indicating signal of a target speed (for example, 1000 to 2400 rpm) corresponding to the position in which the speed indicating lever is operated.

Figure 2:
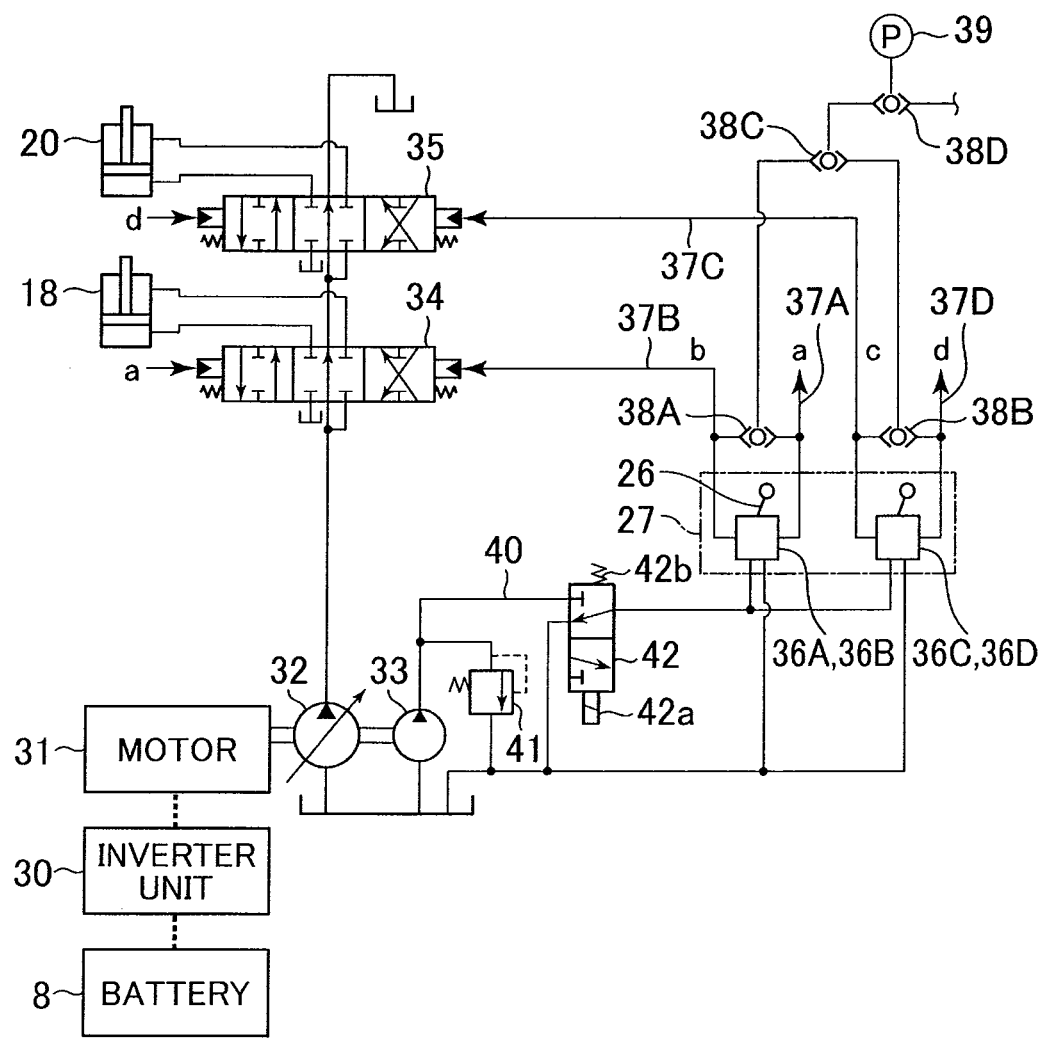
FIG. 2 is a hydraulic circuit diagram showing arrangements relating to drives for a boom and a bucket of a hydraulic drive system according to an embodiment of the present invention.

The right and left crawlers 1, the upper swing structure 3, the swing post 5, the blade 14, the boom 15, the arm 16, and the bucket 17 described above constitute driven members driven by a hydraulic drive system included in the electrically driven hydraulic excavator. FIG. 2 is a hydraulic circuit diagram showing arrangements of a main section of the hydraulic drive system relating to the boom 15 and the bucket 17.

Referring to FIG. 2, the hydraulic drive system includes an inverter unit 30, a main electric drive motor 31, a main pump 32, a pilot pump 33, a boom directional control valve 34, a bucket directional control valve 35, and the hydraulic pilot type operating device 27. Specifically, the inverter unit 30 converts DC electric power from the battery 8 (for example, a lithium battery) to corresponding AC electric power and outputs the AC electric power. The main electric drive motor 31 is driven by the AC electric power from the inverter unit 30. The main pump 32 and the pilot pump 33 are driven by the main electric drive motor 31. The boom directional control valve 34 and the bucket directional control valve 35 control a flow of hydraulic fluid from the main pump 32 to the boom hydraulic cylinder 18 and the bucket hydraulic cylinder 20, respectively. The operating device 27 includes the boom/bucket control lever 26.

The operating device 27 includes the control lever 26, a pilot valve 36A, a pilot valve 36B, a pilot valve 36C, and a pilot valve 36D. Specifically, the pilot valve 36A generates a pilot pressure a by reducing a delivery pressure of the pilot pump 33 according to an operating amount of the control lever 26 forward of a neutral position of the control lever 26. The pilot valve 36B generates a pilot pressure b by reducing the delivery pressure of the pilot pump 33 according to the operating amount of the control lever 26 rearward of the neutral position of the control lever 26. The pilot valve 36C generates a pilot pressure c by reducing the delivery pressure of the pilot pump 33 according to the operating amount of the control lever 26 leftward of the neutral position of the control lever 26. The pilot valve 36D generates a pilot pressure d by reducing the delivery pressure of the pilot pump 33 according to the operating amount of the control lever 26 rightward of the neutral position of the control lever 26.

When the control lever 26 is operated forwardly, for example, the pilot pressure a generated by the pilot valve 36A according to the operating amount involved is output to a pressure receiving portion of the boom directional control valve 34 via a pilot line 37A. This changes the element position of the boom directional control valve 34 to that on the left-hand side in the figure. As a result, the boom hydraulic cylinder 18 is contracted. When, on the other hand, the control lever 26 is operated rearwardly, the pilot pressure b generated by the pilot valve 36B according to the operating amount involved is output to a pressure receiving portion of the boom directional control valve 34 via a pilot line 37B. This changes the element position of the boom directional control valve 34 to that on the right-hand side in the figure. As a result, the boom hydraulic cylinder 18 is extended.

Alternatively, when the control lever 26 is operated leftwardly, for example, the pilot pressure c generated by the pilot valve 36C according to the operating amount involved is output to a pressure receiving portion of the bucket directional control valve 35 via a pilot line 37C. This changes the element position of the bucket directional control valve 35 to that on the right-hand side in the figure. As a result, the bucket hydraulic cylinder 20 is extended. When, on the other hand, the control lever 26 is operated rightwardly, the pilot pressure d generated by the pilot valve 36D according to the operating amount involved is output to a pressure receiving portion of the bucket directional control valve 35 via a pilot line 37D. This changes the element position of the bucket directional control valve 35 to that on the left-hand side in the figure. As a result, the bucket hydraulic cylinder 20 is contracted.

Though not shown, arrangements of the hydraulic drive system relating to driven members other than the boom 15 and the bucket 17 (specifically, the right and left crawlers 1, the upper swing structure 3, the swing post 5, the blade 14, and the arm 16) are arranged in the same manner. Each of operating devices thereof is the hydraulic pilot type, as with the operating device 27 described above, and includes pilot valves that generate a pilot pressure by reducing the delivery pressure of the pilot pump 33 according to the operating amount of a control lever (or a control pedal).

A shuttle valve 38A is connected across the pilot lines 37A, 37B of the operating device 27. A shuttle valve 38B is connected across the pilot lines 37C, 37D of the operating device 27. A shuttle valve 38C is connected between an output port of the shuttle valve 38A and an output port of the shuttle valve 38B. As a result, the highest pressure of the pilot pressures a to d of the operating device 27 is to be output from the shuttle valve 38C. In addition, a group of shuttle valves (not shown) are disposed for outputting the highest pressure of the pilot pressures of the operating devices other than the operating device 27. A shuttle valve 38D is connected between an output port of a shuttle valve (not shown) of a final stage in this group of shuttle valves and an output port of the shuttle valve 38C. This results in the highest pressure of pilot pressures of all operating devices (hereinafter referred to as a maximum pilot pressure) being output from the shuttle valve 38D. A pressure sensor 39 is connected to an output port of the shuttle valve 38D and the pressure sensor 39 is adapted to detect the maximum pilot pressure.

A pilot relief valve 41 is connected to a delivery hydraulic line 40 of the pilot pump 33. The pilot relief valve 41 establishes a maximum delivery pressure of the pilot pump 33. In addition, a lock valve 42 is disposed on the delivery hydraulic line 40 of the pilot pump (or stated differently, a hydraulic line between the pilot pump 33 and the operating devices). The element position of the lock valve 42 is changed according to the operation of the lock lever 25 described earlier. Specifically, there is provided a lock switch 43 (see FIG. 3 to be described later) that is open when the lock lever 25 is in the unlocked position (the lowered position) and closed when the lock lever 25 is in the locked position (the raised position). For example, when the lock switch 43 is closed, a solenoid portion 42a of the lock valve 42 is energized via the lock switch 43, so that the element position of the lock valve 42 is changed to a lower position in the figure. This provides communication with the delivery hydraulic line 40 of the pilot pump 33, thus introducing the delivery pressure of the pilot pump 33 to the operating devices. When the lock switch 43 is open, on the other hand, the solenoid portion 42a of the lock valve 42 is not energized, so that the element position of the lock valve 42 is changed to an upper position in the figure by an urging force of a spring 42b. This interrupts the delivery hydraulic line 40 of the pilot pump 33. As a result, no pilot pressure is generated even when the operating device is operated, so that the hydraulic actuator is not actuated.

Figure 3:
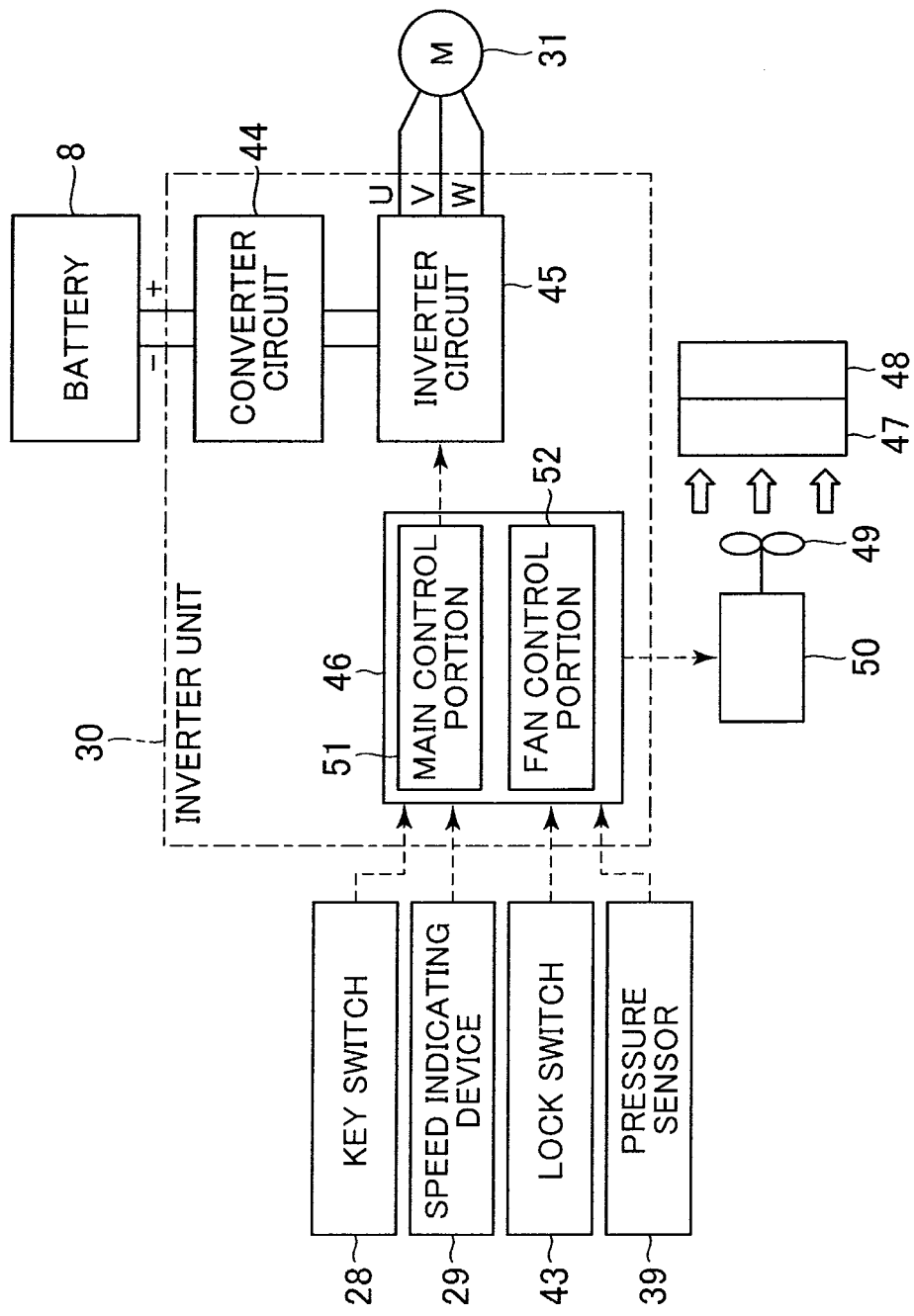
FIG. 3 is a block diagram showing arrangements of an inverter unit and other devices associated therewith according to the embodiment of the present invention.

FIG. 3 is a block diagram showing arrangements of the inverter unit 30 and other devices associated therewith.

Referring to FIG. 3, the inverter unit 30 includes a converter circuit 44, an inverter circuit 45, and an arithmetic control section (microcomputer) 46. Specifically, the converter circuit 44 increases a DC voltage of about 150 to 180 V from the battery 8 to about 270 V. The inverter circuit 45 generates AC electric power from DC electric power with a voltage increased by the converter circuit 44 and supplies the AC electric power to the main electric drive motor (permanent magnet synchronous motor) 31.

In addition, a coolant system (not shown) is also provided for cooling the inverter unit 30 and the main electric drive motor 31. The coolant system includes an air-cooled radiator 47 and a circulation pump (not shown). Specifically, the radiator 47 cools the coolant. The circulation pump circulates the coolant between the radiator 47 and the inverter unit 30 and the main electric drive motor 31. An air-cooled oil cooler 48 is also provided for cooling hydraulic operating fluid. In addition, a cooling fan 49 and a fan electric drive motor 50 are provided. The cooling fan 49 generates cooling air for the radiator 47 and the oil cooler 48. The fan electric drive motor 50 is driven by the electric power of the battery 8 to thereby rotate the cooling fan 49.

Figure 4:
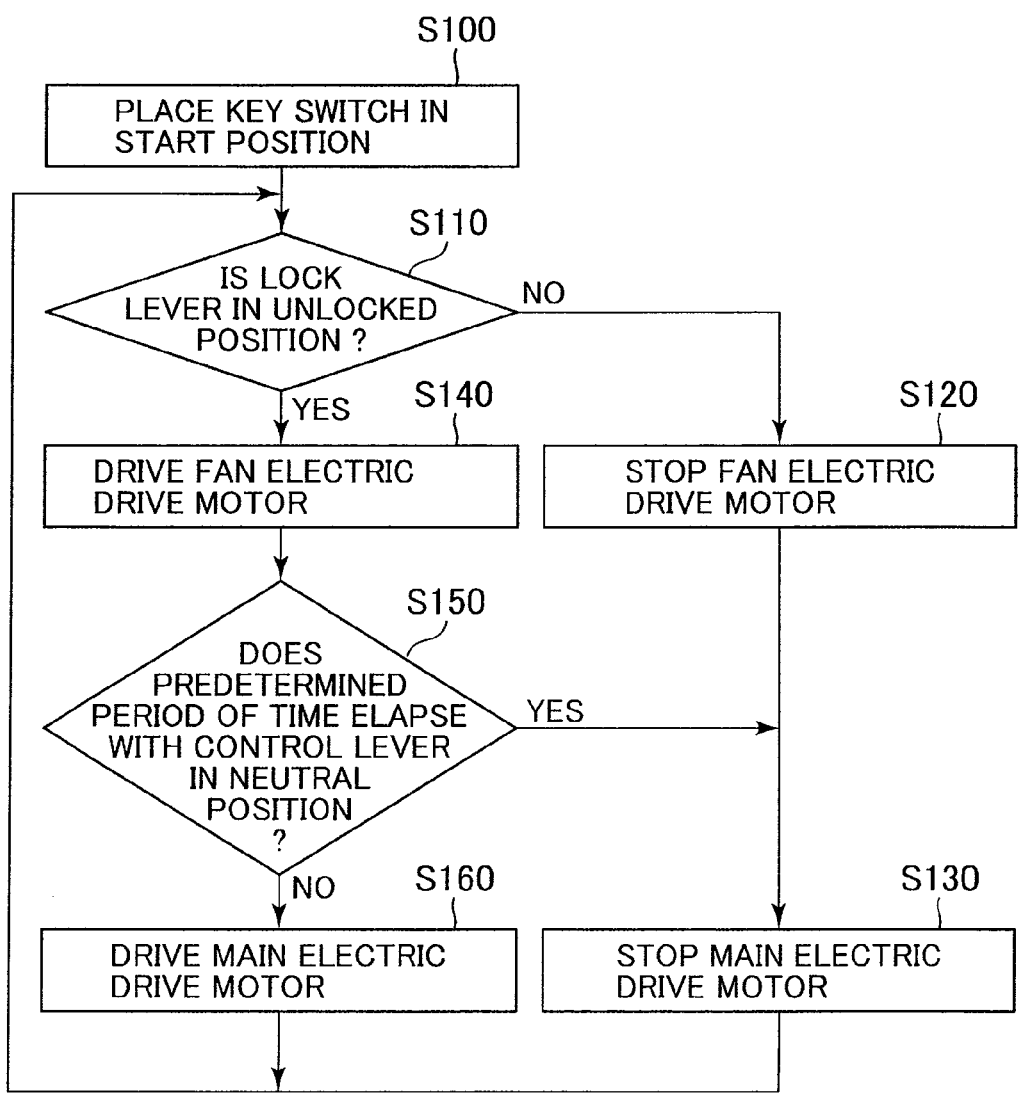
FIG. 4 is a flow chart showing steps to be performed in an arithmetic control section of the inverter unit according to the embodiment of the present invention.

The arithmetic control section 46 of the inverter unit 30 receives inputs of signals from the key switch 28, the speed indicating device 29, the lock switch 43, and the pressure sensor 39 described above. The arithmetic control section 46 includes a main control portion 51 and a fan control portion 52. Specifically, the main control portion 51 controls the main electric drive motor via the inverter circuit 45 based on the abovementioned input signals. The fan control portion 52 controls the fan electric drive motor 50 via a motor drive relay (not shown) based on the abovementioned input signals. Control procedures by the arithmetic control section 46 will be described with reference to FIG. 4. FIG. 4 is a flow chart showing steps to be performed in the arithmetic control section 46 of the inverter unit 30.

Referring to FIG. 4, in step 100, the operator, with an intention to start the hydraulic excavator, operates the key switch 28 from an OFF position to a START position. Then, power of the inverter unit 30 or the like is turned on and, at the same time, a direction signal from the key switch 28 is input to the arithmetic control section 46 of the inverter unit 30. Then, in step 110, the main control portion 51 and the fan control portion 52 determine whether a signal is input from the lock switch 43 to thereby determine whether the lock lever 25 is in the unlocked position. For example, when the lock lever 25 is in the locked position (or stated differently, when no signal is input from the lock switch 43), a determination of step 110 is not satisfied and the operation proceeds to step 120. In step 120, the fan control portion 52 stops the fan electric drive motor 50 to thereby bring the cooling fan 49 to a stop. Specifically, no control signal is output to the motor drive relay to thereby open relay contacts, so that supply of electric power to the fan electric drive motor 50 is interrupted. The operation then proceeds to step 130 and the main control portion 51 stops the main electric drive motor 31 via the inverter circuit 45. Thereafter, the operation returns to step 110 and the same steps as above are repeated.

When the lock lever 25 is in the unlocked position in step 110 (or stated differently, when a signal is input from the lock switch 43), the determination thereof is satisfied and the operation proceeds to step 140. In step 140, the fan control portion 52 drives the fan electric drive motor 50 to thereby rotate the cooling fan 49. Specifically, a control signal is output to the motor drive relay to thereby energize a relay coil and close the contacts, so that electric power is supplied to the fan electric drive motor 50.

Then, the operation proceeds to step 150 and the main control portion 51 determines, based on the maximum pilot pressure detected by the pressure sensor 39, whether none of the operating devices is operated (or stated differently, the control levers and the control pedals of all operating devices are in their respective neutral positions). The main control portion 51 then determines whether a predetermined period of time Δt1 (for example, 4 seconds) elapses under a condition in which the lock lever 25 is placed in the unlocked position and none of the operating devices is operated. More specifically, the main control portion 51 determines whether the maximum pilot pressure detected by the pressure sensor 39 is less than a predetermined first threshold value P1 (see FIG. 5 to be described later) to thereby first determine whether none of the operating devices is operated. Upon determining that the condition, in which the lock lever 25 is placed in the unlocked position and none of the operating devices is operated, holds, the main control portion 51 starts a timer and determines whether the timer counts the predetermined period of time Δt1 or more. After the timer has been started, the main control portion 51 determines whether the maximum pilot pressure detected by the pressure sensor 39 is equal to or more than a predetermined second threshold value P2 (where, P2>P1; see FIG. 5 to be described later), thereby determining whether any of the operating devices is operated. When it is determined that any of the operating devices is operated, the timer is reset.

For example, in step 150, when any of the operating devices is operated, or when the predetermined period of time Δt1 is not yet to elapse under the condition in which the lock lever 25 is placed in the unlocked position and none of the operating devices is operated, the determination of step 150 is not satisfied and the operation proceeds to step 160. In step 160, the main control portion 51 varies a voltage applied to the main electric drive motor 31 via the inverter circuit 45 such that the speed of the main electric drive motor 31 is the target speed directed by the speed indicating device 29. Thereafter, the operation returns to step 110 and the same steps as above are repeated.

For example, in step 150, when the predetermined period of time Δt1 elapses under the condition in which the lock lever 25 is placed in the unlocked position and none of the operating devices is operated, the determination of step 150 is satisfied and the operation proceeds to step 130 described above. In step 130, the main control portion 51 stops the main electric drive motor 31 via the inverter circuit 45. Thereafter, the operation returns to step 110 and the same steps as above are repeated.

Operations in this embodiment will be described with reference to FIG. 5. FIG. 5 is a timing chart for illustrating the operations in this embodiment.

For example, the operator, with an intention to start the hydraulic excavator, places the key switch 28 in the START position with the lock lever 25 placed in the locked position. When the operator thereafter places the lock lever 25 in the unlocked position (at time t1), the lock switch 43 is closed to thereby operate the lock valve 42, which provides communication with the delivery hydraulic line 40 of the pilot pump 33. At this time, with the determination of step 110 of FIG. 4 being satisfied, the inverter unit 30 drives the fan electric drive motor 50 in step 140. In the beginnings of starting of the hydraulic excavator or while the operator is operating any of the operating devices (time t1 to t2), the determination in step 150 is not satisfied and, in step 160, the main electric drive motor 31 is driven.

If the operator does not thereafter temporarily operate any of the operating devices with the lock lever 25 left in the unlocked position (time t2), the determination in step 150 is not satisfied until the predetermined period of time Δt1 elapses (time t2 to t3). Then, in step 160, driving of the main electric drive motor 31 is continued. When the predetermined period of time Δt1 elapses (time t3), the determination in step 150 is satisfied and, in step 130, the main electric drive motor 31 is stopped. When the operator thereafter operates any of the operating devices (time t4), the determination in step 150 is not satisfied and in step 160, the main electric drive motor 31 is driven.

The above-described operations are repeatedly performed (time t4 to t8). When the operator thereafter intends to interrupt work of the hydraulic excavator and places the lock lever 25 in the locked position (time t8), the inverter unit 30, with the determination in step 110 not being satisfied, stops the fan electric drive motor 50 in step 120 and stops the main electric drive motor 31 in step 130.

As described heretofore, in this embodiment, when the lock lever 25 is placed in the locked position, not only the main electric drive motor 31, but also the fan electric drive motor 50 is stopped. This limits consumption of the battery electric power by the fan electric drive motor 50 as well as the main electric drive motor 31. As a result, an operating time of the electrically driven hydraulic excavator can be extended.

In the above-described embodiment, though not specifically described, the inverter unit 30 may control such that, for example, the circulation pump for circulating the coolant of the radiator 47 is driven and stopped in time with the driving and stopping of the fan electric drive motor 50. In such a modified example, consumption of the battery electric power can be further limited.

In the above-described embodiment, the fan control means has been exemplified by the inverter unit 30 that has a fan control function of driving the fan electric drive motor 50 by outputting a control signal to the motor drive relay according to a signal input from the lock switch 43 applied when the lock lever 25 is placed in the unlocked position. This is, however, not the only possible arrangement. Specifically, the fan control function may, for example, be separated from the inverter unit 30 to as to serve as another control unit. In addition, another possible arrangement is to connect the lock switch 43 with the motor drive relay, so that the signal from the lock switch 43 can be directly output to the motor drive relay. In such a modified example, too, the same effect as that noted above can be achieved.

In the above-described embodiment, the locking means has been exemplified by the arrangement including: the lock switch 43 that opens and closes according as the lock lever 25 is operated; and the solenoid operated lock valve 42 operable by a signal from the lock switch 43 and disposed on the delivery hydraulic line 40 of the pilot pump 33. This is, however, not the only possible arrangement. Specifically, for example, a manual lock valve connected mechanically to the lock lever 25 may be provided. Alternatively, a lever engagement member may be mechanically connected to the lock lever 25 and, when the lock lever is placed in the locked position, the lever engagement member restricts the control lever (or the control pedal) of the operating device. In such modified examples, too, the same effect as that noted above can be achieved.

In the above-described embodiment, the fan electric drive device has been exemplified by the arrangement including the fan electric drive motor 50 that rotates the cooling fan 49. This is, however, not the only possible arrangement. Specifically, for example, the fan electric drive device may include a fan hydraulic motor for rotating the cooling fan 49, a fan pump for generating hydraulic fluid to be supplied to the fan hydraulic motor, and a fan electric drive motor for driving the fan pump. In such a modified example, too, the same effect as that noted above can be achieved.

Though not specifically described, the above-described embodiment may be arranged to include a temperature sensor for detecting temperature of the coolant to be cooled by the radiator 47 and a temperature sensor for detecting temperature of the hydraulic fluid to be cooled by the oil cooler 48 and that detection signals from these temperature sensors are output to the arithmetic control section of the inverter unit 30. The fan control portion 52 of the arithmetic control section 46 of the inverter unit 30 may be adapted to stop the fan electric drive motor 50 when, for example, the lock lever 25 is in the unlocked position, and the detected temperature of the hydraulic fluid is less than a predetermined setting value and the detected temperature of the coolant is less than a predetermined setting value. Additionally, the fan electric drive motor 50 may be adapted to be started only if the detected temperature of the hydraulic fluid is equal to or more than the predetermined setting value or the detected temperature of the coolant is equal to or more than the predetermined setting value, even when the lock lever 25 is operated from the locked position to the unlocked position with the fan electric drive motor 50 in a stationary state. In such modified examples, too, the same effect as that noted above can be achieved.

The above-described embodiment has been described for the arrangement in which all of the operating devices are a hydraulic pilot type, the pressure sensor 39 detects the highest pressure of pilot pressures of all of these operating devices (the maximum pilot pressure), and a determination is made as to whether none of the operating devices is operated based on the maximum pilot pressure detected by the pressure sensor 39. This is, however, not the only possible arrangement. Specifically, for example, if the operating device is an electric lever type (specifically, the operating device includes a displacement detector for outputting an electric operating signal that is variable according to a direction in which a control lever is operated and an amount of operation of the control lever), the determination may be made based on the electric operating signal from the operating device. In such a modified example, too, the same effect as that noted above can be achieved.

Another embodiment of the present invention will be described with reference to FIGS. 6 and 7. In the other embodiment, not only a main electric drive motor 31, but also a fan electric drive motor 50 is stopped, when a predetermined period of time elapses under a condition in which a lock lever 25 is placed in the unlocked position and none of operating devices is operated. Like or corresponding parts are identified by the same reference numerals as those used for the above-described embodiment of the present invention and descriptions for those parts will be omitted.

FIG. 6 is a flow chart showing steps to be performed in an arithmetic control section of an inverter unit 30 according to the another embodiment of the present invention.

Referring to FIG. 6, in step 200, the operator, with an intention to start the hydraulic excavator, operates a key switch 28 from an OFF position to a START position. Then, power of the inverter unit 30 or the like is turned on and, at the same time, a direction signal from the key switch 28 is input to the arithmetic control section 46 of the inverter unit 30. Then, in step 210, a main control portion 51 and a fan control portion 52 determine whether a signal is input from a lock switch 43 to thereby determine whether the lock lever 25 is in the unlocked position. For example, when the lock lever 25 is in the locked position (or stated differently, if no signal is input from the lock switch 43), a determination in step 210 is not satisfied and the operation proceeds to step 220. In step 220, the fan control portion 52 stops the fan electric drive motor 50 to thereby stop a cooling fan 49. The operation then proceeds to step 230 and the main control portion 51 stops the main electric drive motor 31 via an inverter circuit 45. Thereafter, the operation returns to step 210 and the same steps as above are repeated.

When the lock lever 25 is in the unlocked position in step 210 (or stated differently, if a signal is input from the lock switch 43), the determination in step 210 is satisfied and the operation proceeds to step 240. In step 240, the main control portion 51 determines, based on the maximum pilot pressure detected by a pressure sensor 39, whether none of the operating devices is operated. The main control portion 51 then determines whether a predetermined period of time $\Delta t1$ (for example, 4 seconds) elapses under a condition in which the lock lever 25 is placed in the unlocked position and none of the operating devices is operated. Similarly, the fan control portion 52 determines, based on the maximum pilot pressure detected by the pressure sensor 39, whether none of the operating devices is operated and determines whether a predetermined period of time $\Delta t2$ (where, $\Delta t2=\Delta t1$ in this embodiment) elapses under a condition in which the lock lever 25 is placed in the unlocked position and none of the operating devices is operated.

For example, in step 240, when any of the operating devices is operated, or when the predetermined period of time $\Delta t1$ ($=\Delta t2$) is not yet to elapse under the condition in which the lock lever 25 is placed in the unlocked position and none of the operating devices is operated, the determination in step 240 is not satisfied and the operation proceeds to step 250. In step 250, the fan control portion 52 drives the fan electric drive motor 50 to thereby rotate the cooling fan 49. Then, the operation proceeds to step 260 and the main control portion 51 varies a voltage applied to the main electric drive motor 31 via the inverter circuit 45 such that the speed of the main electric drive motor 31 is a target speed directed by a speed indicating device 29. Thereafter, the operation returns to step 210 and the same steps as above are repeated.

For example, in step 240, when the predetermined period of time $\Delta t1$ ($=\Delta t2$) elapses under the condition in which the lock lever 25 is placed in the unlocked position and none of the operating devices is operated, the determination in step 240 is satisfied and the operation proceeds to step 220 described above. In step 220, the fan control portion 52 stops the fan electric drive motor 50 to thereby stop the cooling fan 49. The operation then proceeds to step 230 and the main control portion 51 stops the main electric drive motor 31 via the inverter circuit 45. Thereafter, the operation returns to step 210 and the same steps as above are repeated.

In this embodiment having arrangements as described above, not only the main electric drive motor 31 but also the fan electric drive motor 50 is stopped, when the predetermined period of time elapses under the condition in which the lock lever 25 is placed in the unlocked position and none of operating devices is operated. As compared with the embodiment described above, consumption of the battery electric power by the fan electric drive motor 50 can be further limited.

In the above, the electrically driven hydraulic excavator to which the present invention is applied has been described to include the main electric drive motor 31 as the prime mover for driving the main pump 32 or the like. This is, however, not the only possible arrangement. Specifically, for example, the present invention may be applied to an engine type hydraulic excavator including, for example, an engine as the prime mover. The present invention may still be applied to a hybrid type hydraulic excavator including, for example, an engine and a main electric drive motor as the prime mover. The present invention may still be applied to any construction machine other than the hydraulic excavator. In any of these cases, too, the same effects as those noted above can be achieved.

DESCRIPTION OF REFERENCE NUMERALS

8: battery
25: lock lever
27: operating device
30: inverter unit (fan control means, main control means)
31: main electric drive motor
32: main pump
39: pressure sensor (operation detecting means)
42: lock valve (locking means)

47: radiator (heat exchanger)
48: oil cooler (heat exchanger)
49: cooling fan
50: fan electric drive motor (fan electric drive device)

The invention claimed is:

1. A construction machine comprising:
an air-cooled heat exchanger;
a cooling fan for generating cooling air for the heat exchanger;
a battery;
a fan electric drive device for rotating the cooling fan, the fan electric drive device being driven by electric power of the battery;
fan control means for drivingly controlling the fan electric drive device;
a lock lever disposed at a boarding-alighting port and configured to be operated into an unlocked position and a locked position;
an operating device for directing an operation of a hydraulic actuator; and
locking means for making an operation of the operating device ineffective or the operating device inoperative when the lock lever is operated into the locked position, wherein:
the fan control means stops the fan electric drive device when the lock lever is operated into the locked position.

2. The construction machine according to claim 1, further comprising:
operation detecting means for detecting whether the operating device is in a condition of not being operated, wherein:
the fan control means stops the fan electric drive device when a predetermined period of time elapses under a condition in which the lock lever is operated into the unlocked position and the operating device is in the condition of not being operated.

3. The construction machine according to claim 2, further comprising:
a main pump for generating hydraulic fluid to be supplied to the hydraulic actuator;
a main electric drive motor for driving the main pump, the main electric drive motor being driven by the electric power of the battery; and
main control means for drivingly controlling the main electric drive motor, wherein:
the main control means stops the main electric drive motor when the lock lever is operated into the locked position.

4. The construction machine according to claim 1, further comprising:
a main pump for generating hydraulic fluid to be supplied to the hydraulic actuator;
a main electric drive motor for driving the main pump, the main electric drive motor being driven by the electric power of the battery; and
main control means for drivingly controlling the main electric drive motor, wherein:
the main control means stops the main electric drive motor when the lock lever is operated into the locked position.

5. The construction machine according to claim 4, wherein:
the main control means stops the main electric drive motor when a predetermined period of time elapses under a condition in which the lock lever is operated into the unlocked position and the operating device is in a condition of not being operated.

* * * * *